Sept. 27, 1932.  J. A. PINAUD  1,880,104
PROPELLER
Filed Nov. 1, 1930  3 Sheets-Sheet 1
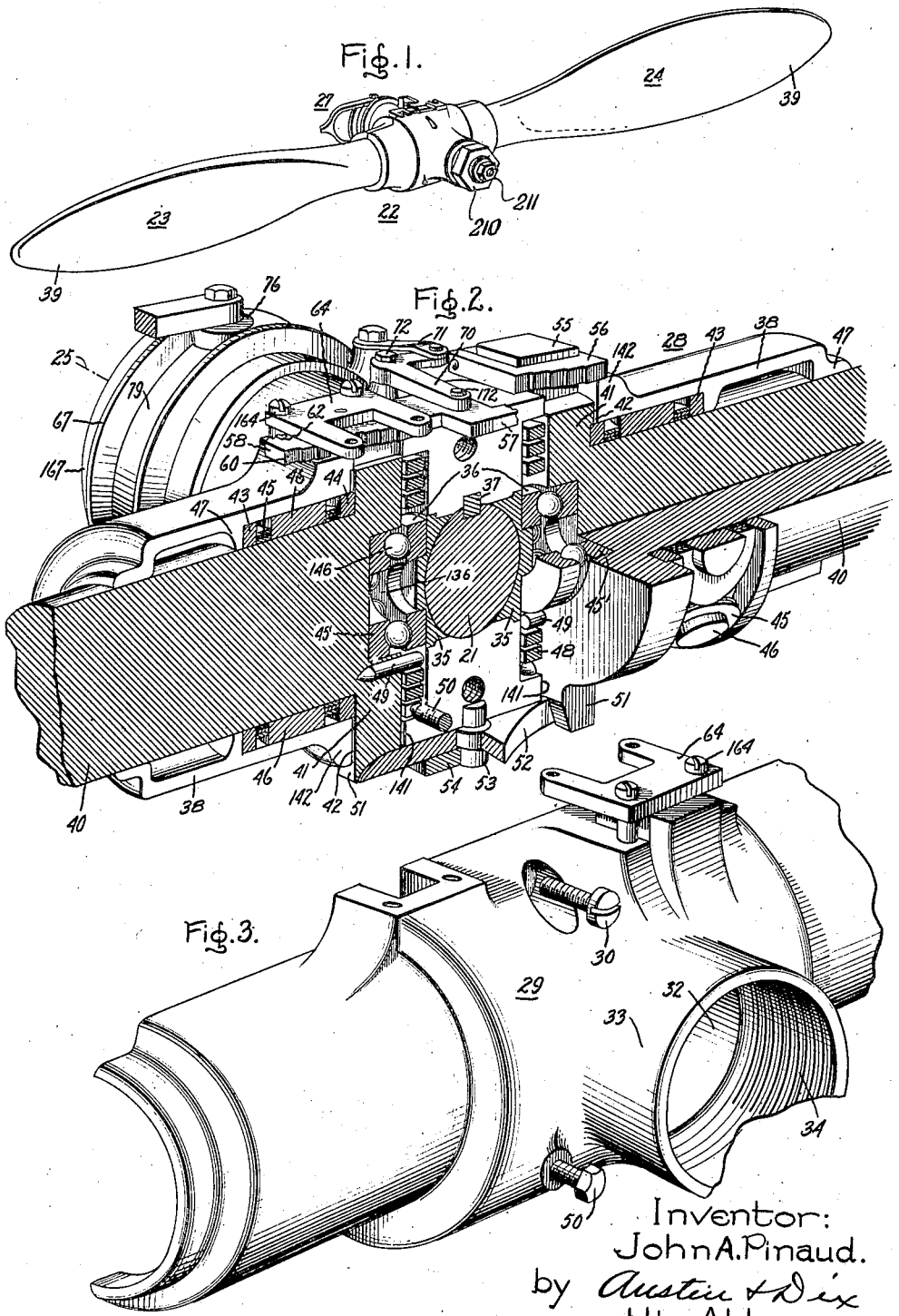
Inventor:
John A. Pinaud.
by Austin & Dix
His Attorneys

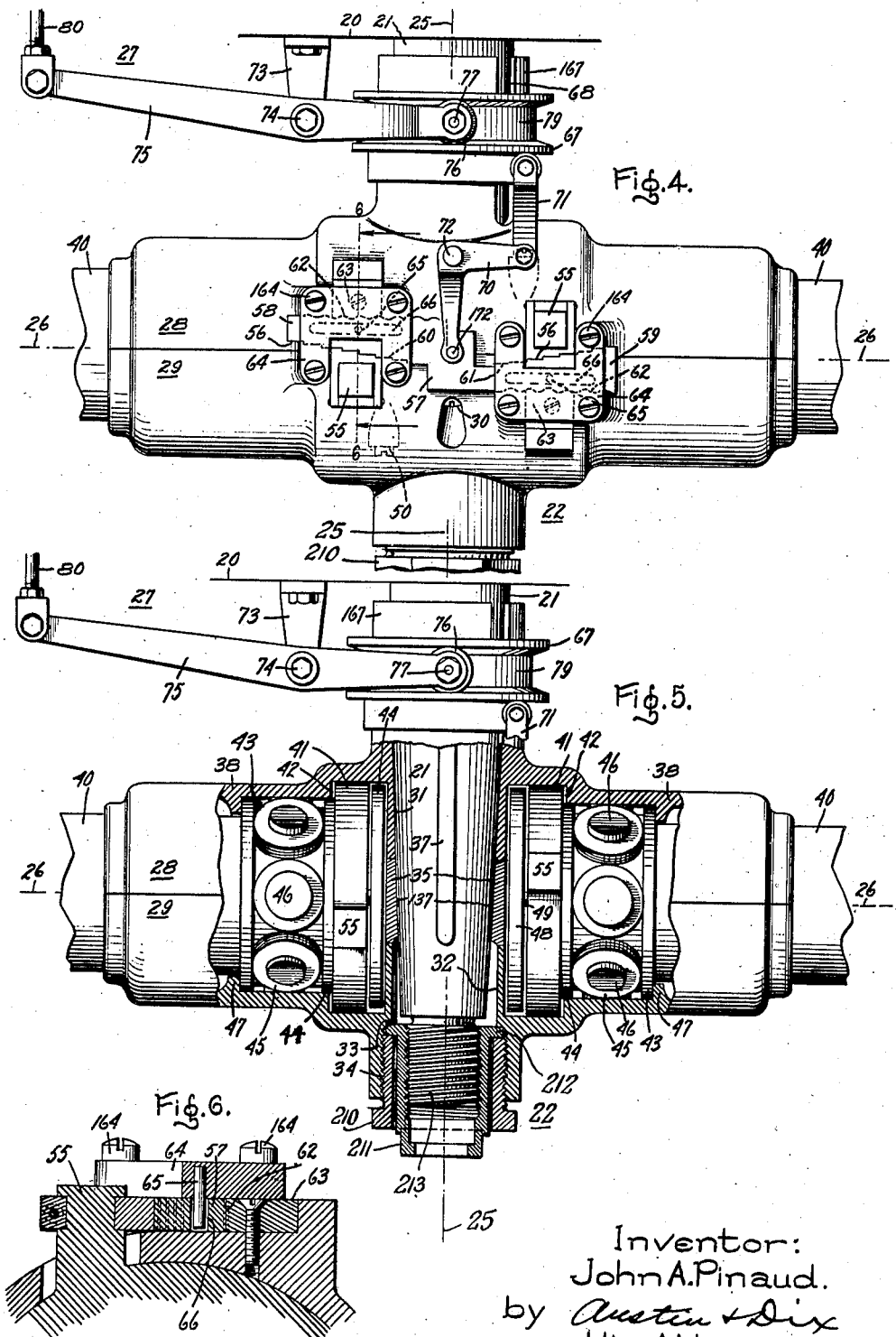

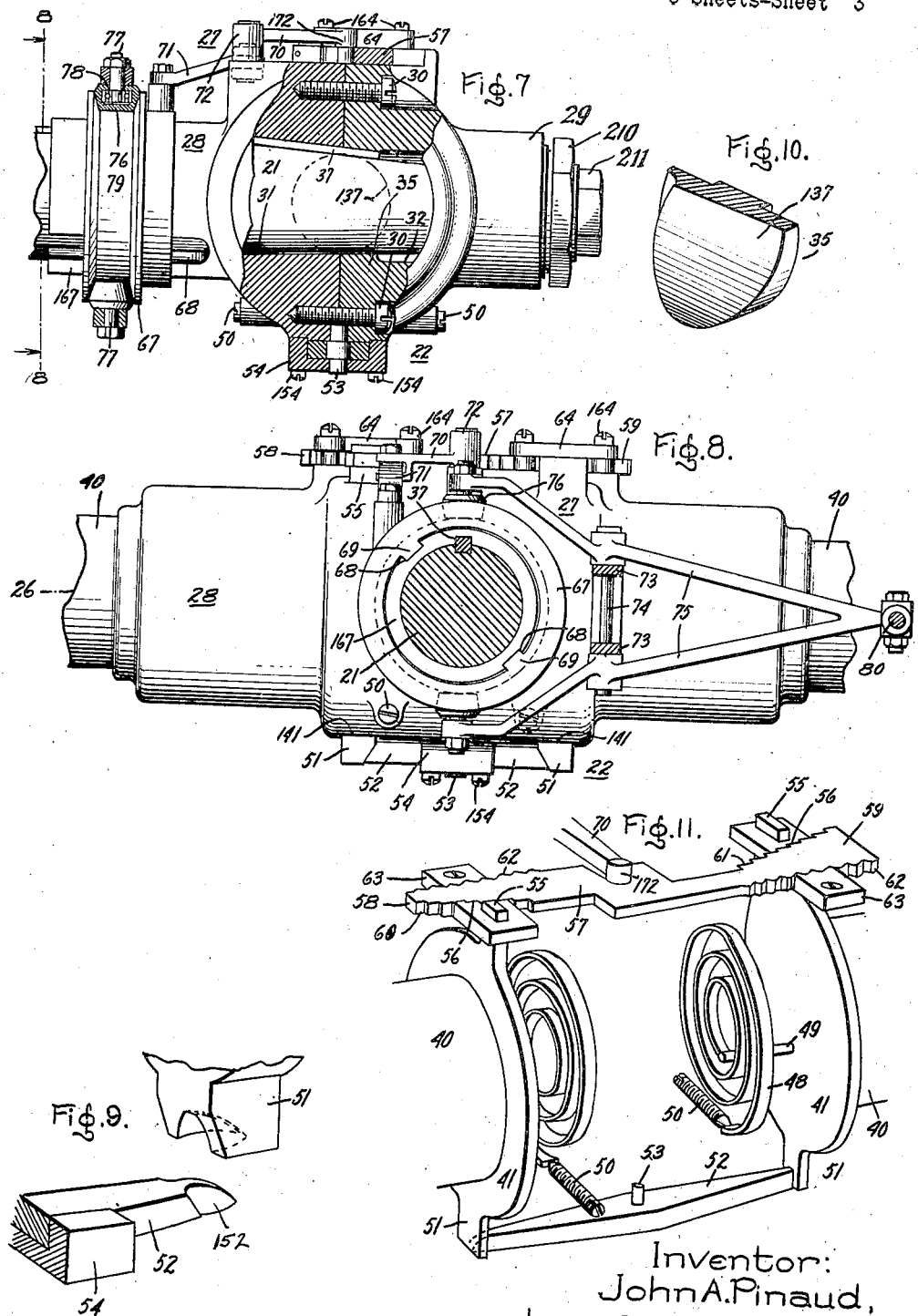

Patented Sept. 27, 1932

1,880,104

UNITED STATES PATENT OFFICE

JOHN A. PINAUD, OF ATLANTIC HIGHLANDS, NEW JERSEY

PROPELLER

Application filed November 1, 1930. Serial No. 492,716.

The invention relates in general to propellers such as are used on aircraft and the like and more particularly to such a propeller whose pitch may be varied for best use under different conditions.

One of the principal objects of the invention is to provide a propeller of the above kind having a locking means for holding the propeller blade at the desired pitch angle, located on the propeller itself.

Another object of the invention is to provide a propeller having two or more blades with mechanism between the blades for insuring that the blades maintain an equal pitch while changing the blade angle.

Another object of the invention is to provide a propeller in which the torque force is utilized to change the blade pitch.

Another object of the invention is to provide a propeller having rolling friction type bearings so arranged that when the blades are being adjusted the bearings are utilized and after the blades have been adjusted the action of the bearings is terminated.

Another object of the invention is to provide a propeller which is rugged in construction and which is simple to operate for adjusting the pitch angles of the blades.

Other objects will be apparent from the following description and claims when considered with the accompanying drawings in which, Fig. 1 is a perspective of a propeller according to the invention;
Fig. 2 is a section taken through the blade axes, parts being shown in perspective;

Fig. 3 is a perspective of the front hub section;

Fig. 4 is a top plan view of the propeller;
Fig. 5 is a top plan view with parts broken away;

Fig. 6 is a section on the line 6—6 of Fig. 4;

Fig. 7 is an elevation with parts broken away;
Fig. 8 is a section on the line 8—8 of Fig. 7;

Fig. 9 is a detail illustrating the gearing between blades;

Fig. 10 is a detail illustrating a bearing block; and Fig. 11 is a skeleton view of the propeller assembly illustrating the operation thereof.

Like reference characters denote like parts in the several figures of the drawings.

In the following description and in the claims parts will be identified by specific names for convenience, but they are intended to be as generic in their application to similar parts as the art will permit.

Referring now to the drawings, 20 denotes a support such as the driving engine of an aircraft and 21 denotes the main drive shaft of such engine. Mounted on the drive shaft 21 is a hub 22 having a pair of blades 23 and 24 journaled therein. Although two blades are shown for purposes of illustration, it will be understood that any number of blades may be used according to the invention.

For convenience in description the position of the propeller shown in Fig. 2 will be taken as a reference. For instance, the side indicated at the top will be known as the top side and the side at the bottom will be known as the bottom side. Furthermore, the axis 25 of the main shaft 21 will be known as the main axis and the axes 26 of the blades 23 and 24 will be known as the blade axes. The mechanism for controlling the blade pitch is indicated by 27.

The hub 22 comprises separable sections 28 and 29, 28 being denoted as the back section and 29 as the front section for convenience of description. These sections form the housing of the hub and are detachably connected together by bolts 30 (Fig. 3). The sections 28 and 29 have a conical bore 31 and the front section 29 also has a bore 32, an annular shoulder 33 and an enlarged bore 34.

Bearing blocks 35 are provided in recesses cut in the hub sections 28 and 29. These bearing blocks are similar and a fragmentary portion of one is illustrated in Fig. 10. These blocks 35 have seats for the inner races 36 of the ball bearings 136 and also have tapered portions 137 fitting the tapered end of shaft 21. A key 37 is provided for non-rotatably connecting the shaft 21 to the sections 28 and 29.

A nut 211 may be threaded on the reduced end 213 of shaft 21 with its flange 212 abutting the shoulder 33 on the hub section 29 to rigidly secure the hub 22 to the shaft 21 and also to assist in holding the hub sections 28 and 29 together. An outer nut 210 surrounding nut 211 is threaded into bore 34 and engages flange 212 to act as a lock nut for nut 211. This arrangement is also useful for removing the propeller from the shaft 21. To remove the propeller outer nut 210 is released a few turns and held from turning while inner nut 211 is turned against nut 210, thus forcing the shaft away from its taper seat in the hub.

The sections 28 and 29 form bearing housings 38 for the fan members or blades 23 and 24. Each fan member comprises a blade portion 39 and a journal portion 40 having a flange 41. The flanges 41 provide positive abutments with the adjoining shoulders 142 on the housings 38 and are normally spaced therefrom as indicated by 42 in Fig. 2 and as will hereinafter be more described in detail.

For providing radial bearings for the journals 40 a pair of flanges 47 are provided. Located between the outer flanges 47 and the journal flanges 41 are spring, rolling anti-friction type bearings, one assembly for each blade. Each spring bearing assembly comprises an outer race 43 and an inner race 44 and a plurality of stacks of flat metal washers 45. See particularly Fig. 2 and Fig. 5. Located in the middle of each stack of washers 45 is a wooden spacing member 46. It will be understood that these spring bearing assemblies act as axial thrust bearings for the propeller blades and normally hold the journal flange 41 spaced from the adjoining part 142 of the housing 38 as indicated at 42.

For providing inner thrust bearings for the blades the ball bearing assemblies 136 above referred to are provided. These assemblies comprise outer races 45' seated in recesses in the journal flanges 41, the inner races 36 above referred to, together with a plurality of balls 146 disposed between these races.

For urging the blades to rotate about the blade axes 26 in opposite directions, a spiral spring 48 is provided for each blade. The inner ends of the springs 48 abut pins 49 inserted into the journals 40. The outer ends of the spiral springs 48 abut set screws 50 passing through the hub housing to the outside where they can be adjusted. Thus, by rotating the set screws 50 the tension of the springs 48 may be controlled.

To insure that the blades maintain substantially equal pitches during adjustment of the blade angle, a gearing arrangement is provided at the bottom of the propeller assembly. The gearing arrangement comprises a pair of teeth 51 projecting from each journal flange 41 through openings 141 in the housing. Meshing the teeth of the two blades is a 2-tooth gear 52 having a single tooth 152 at each end disposed between the pair of teeth 51. The 2-tooth gear or sector 52 is journaled upon a pin 53 having a reduced portion seated in recesses between the halves or sections 28 and 29 of the hub and a second reduced portion seated in a cover plate 54 bolted to flat faces on the hub sections 28 and 29 by bolts 154 as indicated in Fig. 7.

For adjusting the pitch of the propeller blades and for holding the propeller blades in adjusted position a latch arrangement is provided at the top of the propeller assembly. Each journal flange 41 is provided with a projection 55 projecting through an opening in the housing. Secured to the projections 55 are stepped dogs 56. A slidable latch 57 is provided, slidable in the direction of the blade axes 26 by the control mechanism 27 above referred to. The latch 57 (Fig. 4) comprises keys 58 and 59, one for each propeller blade. The keys 58 and 59 are provided with steps 60 and 61 engaging the steps on the dogs 56. The keys 58 and 59 are also provided with corrugated or ridged portions 62 engaging similar portions on blocks 63 which are bolted to the sections 28 and 29.

Disposed over the keys 58 and 59 are U-shaped plates 64 bolted to the sections 28 and 29 by bolts 164, allowing the keys 58 and 59 to slide thereunder between the blocks 63 on the one hand and the dogs 56 on the other. The keys 58 and 59 are provided with slots 66 in which loosely fit pins 65 secured to the plates 64.

The control apparatus 27 is used for adjusting the latch 57. This comprises a collar 67 slidably mounted upon a drum portion 167 secured to the back section 28. The collar 67 is provided with a pair of keys 69 working in key ways 68 so that the collar 67 is constrained to rotate with the propeller but may move along the main axis 25. A bell crank lever 70 is pivoted to the section 28 at 72 and is provided with a pivot 172 working in a slot in the latch 57. A link 71 pivotally connects bell crank lever 70 and the collar 67.

The collar 67 is provided with an annular groove 79 in which is positioned opposite conical rollers 76. The rollers 76 are journaled on studs 77 by ball bearings 78 and the studs 77 are mounted on the fork ends of lever 75. Lever 75 is pivoted to a bracket 73 by a pivot bolt 74, bracket 73 being secured to the motor 20. The rod 80 which is pivoted to the outer end of lever 75 extends to a point within reach of the operator of the aircraft or other device with which this propeller is used.

Referring now to Fig. 11 for an explanation of the operation of the invention, it will be understood that both blades must rotate in opposite directions about their own axes 26 due to the gearing arrangement above described, so that the pitch angle of each blade must remain the same as the other blades.

It is a fact that, when blades, which are free to rotate about their own axes, are rotated about a main axis perpendicular to the blade axes, these blades tend to take positions with their planes perpendicular to the main axis due to the action of the centrifugal force. This action will be called torque action and is resisted by each spiral spring in the above construction. The springs 48 are so adjusted by the set screws 50 that, above a certain speed, the torque action exceeds the force of the springs and the blades tend to assume a decreased pitch, provided the keys 58 and 59 allow them to. This speed will be called for purposes of description, the critical speed. It will thus be seen that the pitch of the blades, when the propeller is rotating about its main axis 25 above critical speed, is determined by the position of the keys 58 and 59 which are controlled by the operator.

At some sped above the critical speed which will be called operating speed for purposes of description, the centrifugal force on the blades will cause the spring bearing assemblies to compress to such an extent that the journal flanges 41 will contact the adjoining shoulders 142 on the hub housing at 42 as above described, thereby providing a frictional contact of large area. This positively holds the blades in adjusted position so long as the speed of rotation of the engine exceeds the operating speed, thus preventing any vibration and possible oscillating movement of the blades about their own axes. The arrangement also serves to limit the maximum stress on the spring bearing assemblies.

To operate the propeller to change the pitch the operator slows down the motor below critical speed, allowing the springs 48 to turn the blades to maximum pitch. This frees the keys 58 and 59 and the operator now adjusts them to positions corresponding to the desired pitch angle. He then speeds up the engine and the centrifugal force causes the pitch to decrease until the dogs engage the keys and then, as the critical speed is exceeded and the operating speed is reached, the spring bearing assemblies compress and the journal flanges 41 engage the shoulders 142 at 42 as above described, these conditions being operating conditions.

It will be understood that it is desirable to change the pitch of a propeller of an aeroplane or similar device since different pitch angles are best for straight travel and for climbing. It will be understood that the present arrangement for adjusting the pitch angles has many advantages. In the first place, when the pitch angle is once adjusted, there is no strain on the control linkage, all the strain being taken up by parts moving with the propeller. Furthermore, antifriction bearing arrangements are provided which come into operation when it is desired that the blades rotate on their own axes, but are automatically thrown out of operation under operating conditions when it is desired that the blades be operatively rigidly secured to the hub. Furthermore, the provision of the spring roller bearings and the large frictional shoulder contact effectively lock the blades in adjusted position under operating conditions so that the pitch, when once adjusted, will remain constant. In addition, the several blades must move in unison and always have the same pitch because of the gearing arrangement provided. Furthermore, all operating parts are duplicated so that the system stands in both static and dynamic balance.

Although a certain specific arrangement has been described for purposes of illustrating the invention, it will be understood that various changes and substitutions of parts may be made without departing from the spirit and scope of this invention.

What is claimed is:—

1. In a propeller for aircraft and the like, a supporting member for rotation about a main axis, a blade member for rotation about its own axis, said blade member being journaled on said supporting member, positive abutting shoulders between said members to engage when said blade member rotates above a predetermined speed and a compressible rolling anti-friction type bearing holding said shoulders spaced under said predetermined speed and compressible to allow said shoulders to engage above said predetermined speed.

2. In a propeller, a supporting member for rotation about a main axis, a blade member mounted on said supporting member for rotation about its own axis, a rolling anti-friction type bearing between said members, and means whereby said bearing is operative when said blade member moves about its own axis but is inoperative when said blade member does not move about its own axis.

3. A propeller for aircraft and the like comprising a supporting member for rotation about a main axis, a blade member for rotation about its own axis to adjust the pitch angle of said blade member, means opposing the torque action of said blade member, and locking means between said members operable only when the propeller exceeds a predetermined speed about its main axis.

4. A propeller for aircraft and the like comprising a supporting member for rotation about a main axis, a blade member for rotation about its own axis to adjust the pitch angle of said blade member, a spring between said members opposing the torque action of said blade member, locking means between said members operable only when the propeller exceeds a predetermined speed about its main axis, the pitch of said blade member being adjusted by decreasing the speed below said predetermined speed to free said locking means whereby it may be adjusted to a position corresponding to the new desired pitch angle.

5. In a propeller for aircraft and the like, a base, a supporting member journaled in said base for rotation about a main axis, a blade member for rotation about its own axis journaled on said supporting member, a locking device between said members for determining the pitch angle of said blade member, control linkage between said base and locking device, said linkage being free of locking stress during normal operation of the propeller.

6. In a propeller for aircraft and the like, a base, a supporting member journaled in said base for rotation about a main axis, a blade member for rotation about its own axis journaled on said supporting member, a locking device between said members for determining the pitch angle of said blade member, control linkage between said base and locking device, said linkage being free of locking stress during normal operation of the propeller, means opposing the torque action of said blade member causing said locking device to disengage under a predetermined speed, a compressible anti-friction bearing between said members operative to journal said blade member below a predetermined speed, and positive engaging means between said members engageable to hold said members locked above a predetermined speed.

7. In a propeller for aircraft and the like, a base, a supporting member journaled in said base for rotation about a main axis, a blade member for rotation about its own axis, said blade member being journaled on said supporting member with said axes substantially perpendicular and substantially intersecting, a locking device between said members for positively determining the pitch angle of said blade member, control linkage between said base and locking device, said linkage being free of locking stress during normal operation of the propeller.

8. In a propeller for aircraft and the like, a supporting member for rotation about a main axis, a blade member for rotation about its own axis to adjust the pitch angle of the blade member, said blade member being journaled in said supporting member, positive abutting shoulders between said members to engage when said blade member rotates above a predetermined speed, a compressible rolling anti-friction type bearing holding said shoulders spaced under said predetermined speed and compressible to allow said shoulders to engage above said predetermined speed, and a second rolling anti-friction bearing between said members taking the spring thrust of said first bearing, whereby said blade member may turn on said bearings under said predetermined speed.

9. In a propeller, a hub member comprising a central mounting part and radial bearing parts, blades journaled in said bearing parts, springs acting between said bearing parts and blades opposing the torque action of said blades, compressible axial thrust bearings acting between said bearing parts and blades, positive abutments on said blades and bearing parts out of engagement when the propeller rotates under a predetermined speed but in engagement above said predetermined speed when said thrust bearings compress, gearing between said blades to hold them in unison, interlocking devices between said bearing parts and blades to vary and limit the position of said blades about their own axes, and means for operating said interlocking devices from a point remote from said hub member.

10. In a propeller, a support, a main shaft journaled in said support, a hub comprising alined, laterally projecting bearing housings and alined back and front mounting parts, said mounting parts having bores for receiving said main shaft, a pair of propeller blades having journals disposed in said housings, a journal flange on each journal, springs acting between said blades and hub, outer shoulders on said housings, compressible, rolling, anti-friction type bearings between said flanges and outer shoulders, ball bearings between said flanges and mounting parts, gear teeth on said flanges, a gear sector journaled on said hub and meshing said teeth, a slidable latch on said hub having stepped keys, projections on said flanges engaging said keys, and means for operating said latch.

11. In a propeller, a support, a main shaft journaled in said support, a hub comprising back and front sections having complimentary half sleeve portions forming alined, laterally projecting bearing housings, said back and front sections having alined back and front mounting parts respectively whose axes intersect the axes of said bearing housings at right angles, said mounting parts having bores for receiving said main shaft, a pair of propeller blades having journals disposed in said housings, a journal flange on each journal, springs acting between said blades and hub, outer shoulders on said housings, compressible, rolling anti-friction type bearings between said flanges and outer shoulders, rolling anti-friction type bearings between said flanges and mounting parts, gear teeth on said flanges, a gear sector journaled on the bottom of said hub and meshing said teeth, a slidable latch at the top of said hub having stepped keys, projections on said flanges engaging said keys, and means for operating said latch to vary the pitch of said blades.

12. In a propeller, a support, a main shaft journaled in said support, a hub comprising back and front sections having complimentary half sleeve portions forming alined, laterally projecting bearing housings, said back and front sections having alined back and front mounting parts respectively whose axes intersect the axes of said bearing housings at right angles, said mounting parts having bores for receiving said main shaft, said mounting parts having side recesses, bearing blocks in said recesses and fitting said shaft, a pair of propeller blades having journals disposed in said housings, a journal flange at the inner end of each journal, said sections having chambers on opposite sides of said shaft, spiral springs in said chambers acting between said blades and hub, outer shoulders on said housings, compressible, rolling antifriction type bearings between said flanges and outer shoulders, ball bearings between said flanges and bearing blocks, gear teeth on said flanges, a gear sector journaled on the bottom of said hub and meshing said teeth, a slidable latch at the top of said hub having stepped keys, projections on said flanges engaging said keys, and means for operating said latch.

13. In a propeller, a support, a main shaft journaled in said support, a hub comprising back and front sections having complimentary half sleeve portions forming alined, laterally projecting bearing housings, said back and front sections having alined back and front mounting parts respectively whose axes intersect the axes of said bearing housings at right angles, said mounting parts having bores for receiving said main shaft, said mounting parts having side recesses, bearing blocks in said recesses and fitting said shaft, a pair of propeller blades having journals disposed in said housings, a journal flange at the inner end of each journal, said sections having chambers on opposite sides of said shaft, spiral springs in said chambers acting between said blades and hub, outer shoulders on said housings, compressible, rolling antifriction type bearings between said flanges and outer shoulders, ball bearings between said flanges and bearing blocks, gear teeth on said flanges, a gear sector journaled on the bottom of said hub and meshing said teeth, a slidable latch at the top of said hub having stepped keys, projections on said flanges engaging said keys, a collar having a groove and feather-keyed on said back mounting part, a bell-crank lever pivoted to said back section and to said latch, a link connecting said collar and bell-crank lever, opposed rollers in said groove, and a forked member supporting said rollers and pivoted to said support.

In testimony whereof I have hereunto set my hand.

JOHN A. PINAUD.